United States Patent Office 3,151,057
Patented Sept. 29, 1964

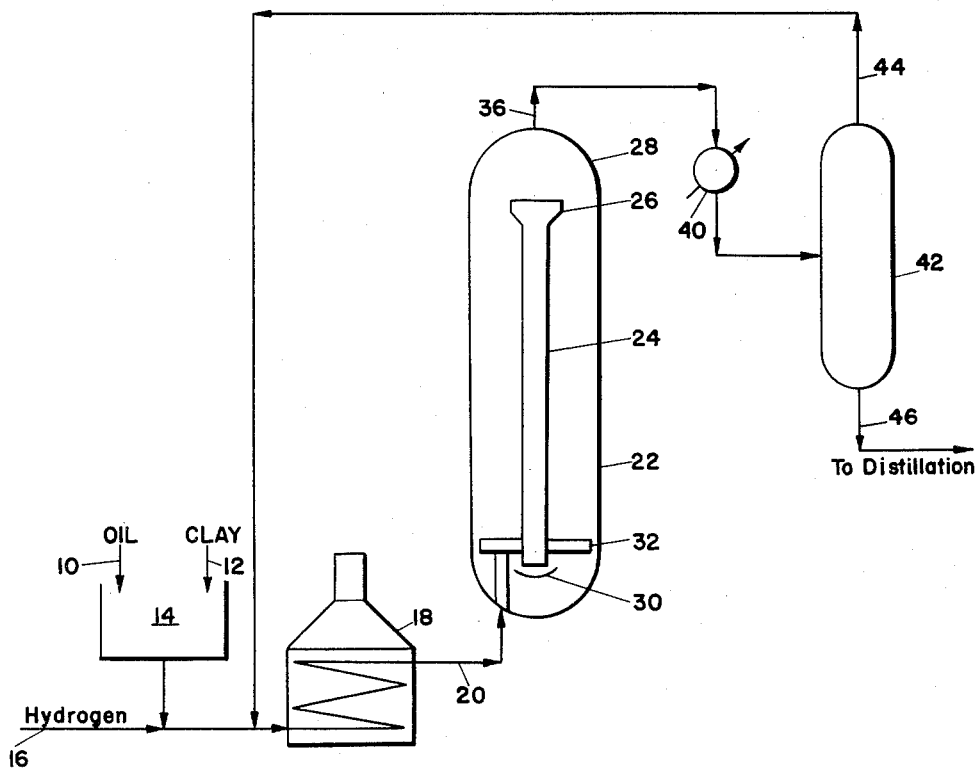

3,151,057
SUSPENSION HYDROGENATION OF
HEAVY STOCKS
Seymour C. Schuman, Princeton, Edwin T. Layng, Summit, and Michael C. Chervenak, Pennington, N.J., assignors to Hydrocarbon Research, Inc., New York, N.Y., a corporation of New Jersey
Filed Dec. 29, 1961, Ser. No. 163,193
3 Claims. (Cl. 208—111)

This invention relates to the cracking of heavy hydrocarbon oils with hydrogen for the purpose of visbreaking, hydrogenation-cracking and general upgrading of such oils.

The highly developed history of hydrogenation for the refining of hydrocarbon oils is discussed in the patent of Pichler, 2,910,433 in which advantages of longer catalyst life and better temperature control were shown to result from a recycle of the partially reacted oil at reactor effluent conditions.

In the later patent of Keith-Layng, 2,987,467, recognition was given to the recycle principle of Pichler and in addition it was noted that the hydrogenation process was considerably improved when the liquid flow was upwardly through a catalyst bed of such size and under such flow rates as would expand the bed at least 10% to permit the particles to be in random motion. This latter patent also described the significant advantage resulting from a first stage partial cracking of a heavy liquid charge whereby at least 25% of the hydrocarbons boiling above 900° F. were concerted to hydrocarbons boiling below 900° F. This greatly simplified and economized the subsequent (second stage) desulfurization step.

The disclosures in the above two patents applied to hydrogenation systems in which the catalyst or contact agent, although in motion in the patent of Keith-Layng, was completely retained in the reactor, except for very slight amounts which might be carried out due to attrition of the aforesaid catalyst or contact agent.

While we have taken full advantage of the prior art including the disclosures in the above two patents, we have also discovered, and found highly significant, an improved hydrogenation operation in which the feed to the reactor as well as the discharge from the reactor contains no substantial amount of solids beyond the amount of ash-forming residue generally permitted in commercial No. 6 fuel oil. However, particles of such a size as to flow with the oil are present and with an upflow of liquid through the reactor and with recycle of the liquid reactor effluent from top to bottom of the reaction zone, the fines appear to concentrate to such an extent as to give unexpectedly high consumption of hydrogen and freedom from operability problems.

While it was not self-evident that the low concentration of solids permitted in a commercial product (i.e., less than ½ of 1% of solids for No. 6 fuel oil) would accomplish any useful purpose, the results which we have obtained by use of the upflow liquid principle accompanied by the necessary recycling as set forth by Pichler and effected from the top of the reactor to the bottom of the reactor as taught in the Keith-Layng patent show unexpectedly high hydrogen consumptions of at least 100–200 s.c.f./bbl. higher than in the absence of the solids. Such higher hydrogen consumptions make it possible to operate without difficulty a system which is inoperable in the absence of such higher hydrogen consumptions.

While we have not established the mechanism for the effect of the higher hydrogen consumption on operability, it appears that the additional hydrogen effects the hydrogenation of low hydrogen containing molecules present in the heavy oil (asphaltenes, resins and carboids) which would otherwise precipitate from the reacted oil causing pressure drop difficulties both in the reactor and in the after (downstream) equipment.

The exact reason for the improved results obtained by our invention is not known but it seems that in the reaction section which is at high velocity due to the recycle within this zone, the solids are maintained in a state of motion which gives excellent contact between liquid, gas and solid and which does not lead to pressure drop difficulties due to blockage which are experienced in fixed bed systems. However, above the recycle takeoff pipe, the velocity drops sharply tending to maintain the solids within the reactor. Obviously, as more and more solids are added, the amount of solid leaving the reactor becomes the same as that entering. The total effect is the establishment of a high concentration solids zone in the (lower) reactor section contiguous with the recycle flow, in which most of the reaction takes place, with a more dilute section above it in which substantially no, or very little, reaction occurs.

If the above mechanism is correct, the velocities in the two zones together with the particle size of the solid contact agent employed would be critical in obtaining the desired concentration effects. However, it is very difficult to circumscribe these factors, since the true velocities depend on the amount of cracking of the feed, the amount of hydrogen, the amount of recycle, the amount of vaporization of the liquid feed, temperature, pressure and other factors; also, there is difficulty in circumscribing the particle size of the contact agent since the fine solids used generally encompass a range of sizes and since it is possible that they grow as they pass through the reactor. However, we have established simple criteria which permit the desired results to be obtained. With the feed stocks and operating conditions that are usually used, we find that liquid velocities (including recycle liquid) containing solids in excess of 1.0 pound of oil per second per square foot of reactor (horizontal cross section) are required to establish random motion of the concentrated suspension of solids in the reactor.

We find that a broad range of solid particle sizes are feasible with the above velocities from as coarse as 300 microns to as fine as 5 microns or even below. We likewise find that in the upper reactor section above the recycle the velocity must be 25% or lower than that in the principal reaction zone to allow the degree of concentration which is required.

It should be observed that the concentration of solids in the reactor obtained by our invention involves no expansion of the diameter of the reactor in the upper zone. Such expansion in commercial scale high pressure-high temperature reactors is very costly or even completely impractical. For example, with a reactor of 10 feet in diameter, expansion of the reactor diameter to reduce velocity to 25% of that in the main reaction zone would require a knockout zone which is 20 feet in diameter. Such a reactor would be double in cost of the equivalent reactor as in this invention and impractical to build or ship.

By the present invention it is possible to concentrate the solids in the reactor to a concentration of 10–40 lbs./cubic foot compared to 0.05–5 lbs./cubic foot in the feed and recovered product. We have established that such concentration occurs by a gamma ray device which measures the mass of material across a given cross section of reactor. By this instrument, we have likewise observed a sharply reduced concentration gradient directly above the liquid recycle takeoff pipe. We have observed such effects feeding various types of clays, a waste solid from aluminum processing (Bayermasse) or a synthetic catalyst of the cobalt molybdate type. As will be apparent, these solids have a wide range of particle size and chemical compositions; thus although there is obviously some criticality with respect to solid size and composition, we have not observed such to date.

It is also obvious that concentration of solids may occur in the reactor by other mechanisms than that proposed herein. For example, simple vaporization of part of the feed concentrates the solid in the remaining non-vaporized liquid. Similarly the solid particles proceeding upward in the reactor, being of slightly higher density than the liquid may tend to "slip" backward leading to higher concentrations at the reactor bottom than at its top. Also, the solid may grow in particle size, perhaps nucleated by carbon and/or asphalt; such growth will tend to retain them in the reactor. While such factors may have produced part of the concentrating effects we observe, we believe that these factors are relatively small compared to the mass velocity factors discussed above.

The aforementioned concentration of solids in the reactor to levels in excess of 10 lbs./cubic foot and to as high as 40 lbs./cubic foot is very beneficial. It is well known that many solids (especially when in the finely divided state) have a beneficial effect on the reaction between oil and hydrogen. When the solids are in a concentrated suspension in the reactor, their beneficial effects are enhanced considerably. In general, it can be estimated that feeding 0.5% solids, when the reactor solids concentration is increased to 30% concentration, as in this invention (approximately equal to 15 lbs./cubic foot density), the effect of the fine solid is increased sixtyfold (30/0.5). Such a concentration of the solid is especially beneficial when the solid is only weakly catalytic. For example, various ores and minerals are readily available in the desired particle size at prices of 1¢–5¢/lb.; these materials are only weakly catalytic compared to synthetic catalyst preparations sold at prices in the range of 50¢ to $2.50/lb. However, with the concentrated suspension of the weakly catalytic solid obtained as in this invention, its overall catalytic action is increased to the extent that it actually may be preferable to synthetic catalysts on an overall economic basis.

The feed stocks utilized in our invention are heavy oils containing at least 10 v. percent material which cannot be distilled overhead at 900° F. Most of the feed stocks we use contain at least 50 v. percent boiling above 900° F., whereas some of the feedstocks are 100% boiling above 900° F. (vacuum residuums). Present practice is to sell such residuum-containing material as low grade Bunker C or No. 6 fuel oil; this product generally sells at a lower price than the parent crude from which it has been derived. Thus refiners have attempted to lower the production of this low grade product by cracking residuums with or without hydrogen to higher value distillate products such as gasoline or furnace oil. However, a basic limitation is that the low hydrogen-containing constituents of residual containing oils form coke within the reaction system quite readily. Thus several residuum cracking processes (Delayed Coking, Contact Coking, Fluid Coking) actually produce about 10–30% coke as a product. The only residuum cracking process used commercially which does not produce any coke is called visbreaking; however, the degree of cracking which is allowed is sharply circumscribed by the necessity to avoid making coke which would shut down the unit due to excessive pressure drop. The most recent definitive publication on this process (Beuther, Goldthwait and Offutt, Oil and Gas Journal, November 9, 1959, pages 151–157) discusses such limitations, pointing out that the process cannot be operated practically at a severity to produce more than about 8 v. percent gasoline. At such severity, refinery production of low value No. 6 or Bunker C fuel oil may be reduced to about 70% of that possible without visbreaking. It will be apparent that the gasoline production (and consequent lowering in yield of low value heavy fuel) is increased considerably by the invention described herein.

The object of our invention is to provide a process for the cracking of heavy hydrocarbons in the presence of fine mineral particles whereby higher conversion rates can be obtained as compared with the usual thermal visbreaking.

A further object of our invention is to provide an improved system of cracking of heavy hydrocarbons in the presence of hydrogen wherein the hydrocarbon feed contains either inherently or, by addition, in the order of 0.01 to 1.0 wt. percent of solids of smaller than 300 microns.

Another object of our invention is to provide a hydrovisbreaking operation which minimizes the amount of hydrogen used.

More specifically, our invention is adapted to the cracking of those naturally occurring crudes such as are obtainable from Athabasca tar sands, which inherently carry as much as 1% of finely divided clay.

Further objects and advantages of our invention will appear from the following description of a preferred form of embodiment thereof when taken with the attached drawing in which the figure is a simplified flow diagram for hydrogenation of a heavy crude oil such as Boscan crude.

In the preferred form of embodiment of our invention the heavy hydrocarbon oil is subjected to cracking for the purpose of decreasing the quantity of No. 6 or Bunker C fuel oil obtained from its refining. Such oil, as introduced in the line 10, may contain natural silt or powder of the order of 100 mesh or smaller such as characteristic of Athabasca tar sands, or the charge may be provided with supplemental clay or other minerals introduced through the line 12. If No. 6 fuel oil is to be produced, it is preferable to limit the quantity of solids in the feed to the order of 0.25%. With this concentration completely satisfactory operability can be obtained, since the concentrated suspension built up within the reactor will again reach 10–40%.

The tank 14 may be used to assist the suspension of the solids in the oil. The mixture together with a hydrogen containing gas in line 16 is then conveyed through a suitable heater indicated at 18 in which the reactant mixture is preheated. The mixture is then introduced through line 20 to the reactor 22 at a temperature at least sufficiently high to initiate the hydrogenation reaction within the reactor 22. It will be understood that the charge is under a pressure adequate for the purpose.

The reactor 22 is conveniently a vertical, cylindrical vessel adapted to withstand the high temperatures and pressures as hereinafter discussed. It is also preferably provided with a central vertical conduit or standpipe 24 having an enlarged funnel top indicated at 26.

The standpipe 24 is substantially open at the bottom although usually provided with a baffle 30 to avoid interference with upflowing feed. By introducing the feed and gaseous reactants through the sparger 32 around the standpipe, it is possible to obtain an internal circulation of the liquid up through the zone outside of the standpipe 24 and down through the standpipe 24. This is due to the difference in gravity between the substantially unaerated column of liquid in the standpipe 24 and the relatively low density column of liquid outside of standpipe 24 resulting from the dispersion of the hydrogen and other gas in the liquid therein.

As the velocity of liquid passing upward around the standpipe is much greater than above the top of standpipe due to the rapid circulation of liquid passing through the standpipe, the zone 28 between the top of the standpipe and the liquid takeoff point 36 acts as settling zone which tends to drop solids back in the reactor and concentrate the solids in the reactor. The liquid discharging at 36 thus carries no more solids than were in the feed at 20.

Preferably the reactor is operated at a pressure of about 600–2500 p.s.i. hydrogen partial pressure and at a temperature in the order of about 700°–1000° F. usually about 850° F. The feed space velocity in such case is approximately one volume per hour per volume of reactor and the conversion is preferably such that at least 40% of the material normally boiling above 900° F. is converted to a fraction boiling below 900° F. It will be apparent that by increasing the temperature it is possible to crack at least 75% by volume of the fraction boiling above 900° F. to such a fraction boiling below 900° F.

Following the treatment in reactor 22 the product vapors and liquid of the effluent are partially cooled at 40 and passed into the liquid-gas separator 42. Hydrogen and other gases are removed overhead at 44 and liquid products are drawn off at 46. These will be passed to a suitable distillation operation for the removal of gasoline, furnace oil, catalytic cracking feed stock, etc.

It is to be understood that there are many other embodiments of this invention. The total product may be fed into existing refinery distillation equipment or the product streams with or without cooling may be directly fed into a second stage reactor containing a highly active catalyst such as cobalt molybdate or nickel molybdate which may be in an ebullating bed as proposed by Keith-Layng in Patent 2,987,467. Other possibilities with respect to aftertreatment of the reactor product stream or streams will be apparent to those skilled in the art.

It is to be observed that recycle of the reactor effluent liquid can be obtained by the density difference principle, as illustrated, with the recycle line within the reactor. The same principle may be employed with the recycle line outside of the reactor. A pump may likewise be employed to circulate the liquid, again with the recycle pipe either inside or outside of the reactor.

At this time, we have studied only a small part of the various solids which might be effective in this invention. Finely divided clays, either as mined, or after drying to less than 10% water content, have been seen to be effective. Such materials generally contain iron and small quantities of chromium which may or may not be the active ingredients. Bauxites would act similarly, as would impure iron ores containing over 5% of gangue-like impurities such as silica and/or alumina, and chromites (iron-chromium silica). There are almost an infinite number of more specialized ores such as for example pentlandite (mostly iron-nickel sulfide) and garnierite (magnesium silicate with nickel) which would be similarly effective. All of these ores contain at least 0.5% of at least one of the group V, VI, VII, and VIII oxides or sulfides. The ores may be used as obtained, ground to the desired particle size range if necessary, with or without drying or other treatment; obviously the less treatment carried out, the more economical will be their utilization.

Similarly many other inexpensive solids may be used such as spent cracking, hydroforming, reforming, isomerization, alkylation or hydrofining catalysts obtainable from petroleum refining operations, spent oxidation catalysts (such as may soon be obtained in quantity from automobile smog prevention devices) or spent active carbon. In some cases, depending on the charge stock and operating conditions it may even be possible to use a very small quantity of fresh catalyst in the invention described here. In all cases, however, the solid ultimately obtained in the product oil is not regenerated or re-used. For this reason, and because of the small quantity of solid used, and its low unit and total cost, the operation described in this invention is very economical.

The following examples are based on laboratory observations concerning the process:

EXAMPLE I

*No Solid Present*

The following run was attempted on a 30 b./d. pilot plant charging 14.7° API West Texas long residuum (3.0% sulfur, 10% boiling above 900° F.).

| | |
|---|---|
| Temperature, ° F. | 840 |
| Hydrogen pressure, p.s.i.g. | 2400 |
| Space velocity, v./hr./v. | 2 |
| Hydrogen rate, s.c.f./bbl. | 3000–4000 |
| Internal liquid recycle, v./v. | 20–30 |
| Solid feed rate, percent | None |

By means of the internal liquid recycle, velocities were obtained as specified in this invention. However, with no solid feed in the reactor, downstream pressure drop difficulties were experienced which necessitated unit shut down after 12 hours of operation. The gasoline yield at that time was 16–18 v. percent, substantially more than obtained in thermal visbreaking. The total product liquid contained over 8% BS & W indicating that low hydrogen containing molecules originally present were not hydrogenated and thus precipitated out of the lighter product, or even that such molecules were formed; such high values of the BS & W test invariably indicate an inoperable system. Hydrogen consumption was only 250 s.c.f./bbl.

EXAMPLE II

*No Solid Present-Milder Conditions*

Since the run in Example I may have utilized excessively severe conditions the following operating conditions were evaluated in the next run.

| | |
|---|---|
| Temperature, ° F. | 815 |
| Hydrogen pressure, p.s.i.g. | 2400 |
| Space velocity, v./hr./v. | 1 |
| Hydrogen rate, s.c.f./bbl. | 8000–9000 |
| Internal liquid recycle, v./v. | 20–30 |
| Solid feed rate, percent | None |

Even at the milder operating condition, with no feed of solids, it was necessary to shut down the run after 18 hours due to excessive pressure drop. Product BS & W values again exceeded 5%. When in operation, 18% gasoline yield was again obtained with a hydrogen consumption of 250 s.c.f./bbl.

EXAMPLE III

*Solid Fed With Oil*

The next run employed various clays which were added with the feed in concentrations from 0.4 to 1.4 w. percent. The clays used had particle sizes ranging from 0.12 to 18 microns. Operating conditions were analogous to those in Example II except for the solids addition. The run operated smoothly with no pressure drop difficulties and was shut down voluntarily after 52 hours on stream. Concentration of clay in the reactor to about 10% was observed using the gamma ray scanner. BS & W values in the product liquid were only 1–2%. A naphtha yield of 18% was obtained with a hydrogen consumption of 350–400 s.c.f./bbl. or 100–150 s.c.f./bbl. greater than obtained in the absence of solids.

EXAMPLE IV

*Solid Fed—100% Residuum Charge Stock*

A subsequent run utilized as charge a South Louisiana vacuum bottoms which contains 100% boiling above 900° F. and is thus a more difficult charge stock to process than the long West Texas residuum. Clays similar to that used in Example III were fed at a concentration level of 1%. Operating conditions were otherwise analogous to those in Examples II, III, IV. Again the gamma ray scanner indicated concentration levels corresponding to 10% solids in the reactor with the unit operating smoothly. Such smooth operation was obtained producing 15–18 v. percent naphtha while consuming 400 s.c.f./bbl.; BS & W values on the product liquid were only 1–2%. A refinery utilizing such an operation would produce less than half of the low grade heavy fuel oil yielded by a refinery without residuum processing, or 30% less heavy fuel oil than a refinery with a visbreaker. The operation was completely successful for 74 hours after which an attempt to increase naphtha production to the level of about 22% resulted in operating difficulties.

EXAMPLE V

Solid Present in Oil

Conventional schemes for recovering oil from tar sands, such as those in the Athabascan deposits in Canada, do not readily remove fine silt from the recovered oil. The silt which contains silica, alumina and iron, may be present in concentrations of from 0.5% to 3.0% in the oil; they generally complicate further processing of the oil by conventional refining schemes. Again employing the foregoing process, it has been completely feasible to convert a very heavy Athabascan tar oil to a much lighter synthetic crude oil. The charge stock was 6.5° API gravity with about 65% boiling above 900° F. As received the tar oil contained 2.5% of silt which has no tendency to settle and which proved to be unfilterable. Operating conditions for the tar oil (again run in the pilot plant) were at first essentially those shown for Examples II, III and IV. However, the operation was so completely satisfactory that it proved feasible to utilize much more economical and severe process conditions. The most economical conditions successfully operated were:

Temperature, ° F. _____ 860
Hydrogen pressure, p.s.i.g. _____ 1250
Space velocity, v./hr./v. _____ 1
Hydrogen rate, s.c.f./bbl. _____ 3700–4800
Internal liquid recycle, v./v. _____ >25

At these operating conditions, it was possible to produce a total liquid product of 24° API containing 26 v. percent naphtha. In the course of the tar oil operations, approximately 18,000 gallons of oil were processed with no operating difficulties whatsoever, and with operations ultimately terminated voluntarily.

It was also found that whereas the clay in the charge stock was very difficult to remove, the clay content of the product could be reduced to 0.2 to 0.4% by simple settling operations.

EXAMPLE VI

Waste Catalyst Added

A run similar to that in Example III was successfully carried out using waste catalyst fines from a catalyst manufacturing operation. These fines are rejects from commercial hydrofining catalyst manufacture; thus they can be obtained very cheaply. The fines include a broad range of particle sizes from 100 mesh to pan. As previously, the solids addition rate was initiated at 1% based on oil fed. However, after the reactor solids concentration had built up to 30–40% (in about 3 days) it was possible to lower the feed solids content to 0.05% and ultimately to 0.025%. The run was operated for 37 days producing as high as 18% gasoline with BS & W values consistently less than 1%.

The foregoing description and examples are intended to be illustrative only. Many modifications of the basic process of the invention will suggest themselves to those skilled in the art but such variations conforming to the spirit of the invention are to be considered within the scope of the claims appended hereinafter.

We claim:

1. A proces for treating a heavy hydrocarbon oil having at least 10% boiling above 900° F. and containing from 0.01 to 3 weight percent of finely divided solids of an average size smaller than 100 microns, said solids containing at least 0.5% of an element of periodic groups V, VI, VII, and VIII, in which the oil is contacted with hydrogen at temperatures in the range of 650–950° F. and at a hydrogen pressure above 600 p.s.i. to crack said oil and produce at least 8 volume percent of gasoline boiling to 400° F. which comprises passing said oil containing said solids upwardly through a reaction zone at a velocity in excess of one pound per second per square foot of horizontal cross section of the reaction zone to establish random motion of the solids in the reaction zone, reducing the upward velocity of said liquid at the upper part of the reaction zone to less than 0.25 pound per second per square foot of horizontal cross section to establish a concentration of solids below the point of velocity reduction and removing a reaction product in liquid phase containing substantially the amount of solids fed into the reaction zone.

2. A process as claimed in claim 1 wherein the oil is recovered from tar sands and contains solids in a concentration of from about 0.5 weight percent to 3.0 weight percent, the temperature is in the order of 850° F., the hydrogen pressure is in the order of 1250 p.s.i.g., the space velocity is one with an internal liquid recycle of approximately 25 based on feed.

3. A process as claimed in claim 1 wherein the particles are from the class of clay and bauxite and are added to the oil to the extent of at least 0.5 weight percent to approximately 1.4 weight percent, and wherein the liquid from the upper part of the reaction zone is recycled to the lower part of the reaction zone at a rate of at least 5:1 based on feed until the solids concentration reaches a range of from 10 to 40 pounds per cubic foot.

References Cited in the file of this patent

UNITED STATES PATENTS 2,962,434    Pohlenz _____ Nov. 29, 1960
2,987,465    Johanson _____ June 6, 1961
2,987,468    Chervenak _____ June 6, 1961